United States Patent
Wang et al.

(10) Patent No.: US 9,531,188 B2
(45) Date of Patent: Dec. 27, 2016

(54) FALSE-TRIGGER FREE POWER-RAIL ESD CLAMP PROTECTION CIRCUIT

(71) Applicant: Peking University, Beijing (CN)

(72) Inventors: Yuan Wang, Beijing (CN); Guangyi Lu, Beijing (CN); Jian Cao, Beijing (CN); Xing Zhang, Beijing (CN)

(73) Assignee: Peking University, Beijing (CN)

( * ) Notice: Subject to any disclaimer, the term of this patent is extended or adjusted under 35 U.S.C. 154(b) by 0 days.

(21) Appl. No.: 14/407,027

(22) PCT Filed: Nov. 20, 2013

(86) PCT No.: PCT/CN2013/087486
§ 371 (c)(1),
(2) Date: Dec. 10, 2014

(87) PCT Pub. No.: WO2014/107995
PCT Pub. Date: Jul. 17, 2014

(65) Prior Publication Data
US 2015/0295399 A1    Oct. 15, 2015

(30) Foreign Application Priority Data
Jan. 9, 2013   (CN) .......................... 2013 1 0007998

(51) Int. Cl.
*H02H 9/00* (2006.01)
*H02H 9/04* (2006.01)

(52) U.S. Cl.
CPC ............. *H02H 9/045* (2013.01); *H02H 9/046* (2013.01)

(58) Field of Classification Search
CPC .................................... H02H 9/045
USPC ............................................................ 361/56
See application file for complete search history.

(56) References Cited

U.S. PATENT DOCUMENTS

| | | | |
|---|---|---|---|
| 7,692,907 B2* | 4/2010 | Chen ................... | H01L 27/0292 361/111 |
| 8,243,403 B2* | 8/2012 | Liang .................. | H01L 27/0285 361/111 |
| 2007/0030610 A1 | 2/2007 | Ker et al. | |
| 2008/0304191 A1 | 12/2008 | Riviere et al. | |

FOREIGN PATENT DOCUMENTS

| | | |
|---|---|---|
| CN | 102222891 | 10/2011 |
| CN | 102543963 | 7/2012 |
| CN | 103001200 | 3/2013 |
| CN | 103078305 | 5/2013 |
| CN | 102185305 | 2/2014 |

OTHER PUBLICATIONS

Lu, G., et al. A Power Clamp Circuit Using Current Mirror for On-chip ESD Protection, IEEE,11th International Conference on Solid-State and Integrated Circuit Technology, 2012.
Office Action issued by the China Patent and Trademark Office on Sep. 3, 2014.

* cited by examiner

*Primary Examiner* — Stephen W Jackson
(74) *Attorney, Agent, or Firm* — I P & T Group LLP (57) ABSTRACT

A false-trigger free power-rail ESD clamp protection circuit includes an ESD impact detection component, a discharge transistor, a discharge transistor turn-on channel, and a discharge transistor shutoff channel. The circuit, in a smaller layout area, has very strong electrostatic charge discharge capability under ESD impact, little power leakage during normal power-up, and relatively strong false-trigger immunity capability for quick power-up.

11 Claims, 5 Drawing Sheets

FALSE-TRIGGER FREE POWER-RAIL ESD CLAMP PROTECTION CIRCUIT

This application is a national stage application of PCT/CN2013/087486 filed on Nov. 20, 2013, which claims priority of Chinese patent application number 201310007998.3 filed on Jan. 9, 2013. The disclosure of each of the foregoing applications is incorporated herein by reference in its entirety.

TECHNICAL FIELD

The present invention relates to the technical field of electronic static discharge (ESD) protection of integrated circuit chips, and especially relates to a false-trigger free power-rail ESD clamp protection circuit.

BACKGROUND ART

The electrostatic protection design of an integrated circuit chip is one of necessary conditions for ensuring the reliable work of the chip. The electronic static impact occurs everywhere in life. Along with the continuous development of integrated circuit technology era, the sizes of devices constituting a circuit becomes smaller and smaller. Since the electrostatic impact itself has the features of short time and very large instantaneous current, in the case that the size of a device is small, the electrostatic impact will form a vast equivalent electric field inside the device and directly break through the device, so that the device suffers irreversible physical damage and breaks down.

The purpose of the ESD protection strategy is to provide a low-resistance discharge channel for a large amount of charge brought about by the impact when electrostatic impact occurs. The electrostatic charge is discharged from the low-resistance discharge channel so as to avoid the damage to inside logical circuits. Along with the improvement of technologies, the threat caused by the electrostatic impact to logical circuits of a chip becomes bigger and bigger, and the significance of an effective anti-electrostatic impact protection design scheme becomes more and more prominent correspondingly.

Figure 1:
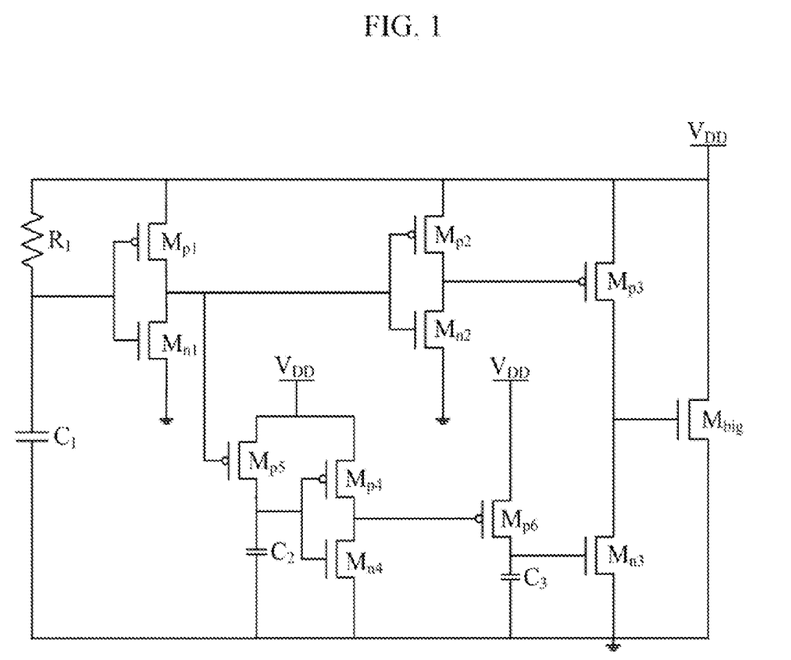
FIG. 1 is a structural schematic diagram of a power supply clamping ESD protection circuit in the prior art.

There are many factors required to be considered for the chip ESD impact protection design. The discharge performance of a discharge device can be optimized from the device level; and an effective discharge device trigger mechanism can be designed from the circuit level, which can allow a discharge device to be effectively turned on when impact occurs and strictly shutoff during normal power-up. Certainly, along with the rising and development of power integrated circuits, the electrostatic protection work of power devices also gains sufficient attention of researchers. The circuit shown in FIG. 1 is a schematic diagram of a known ESD protection circuit, in which the turn-on channel (开启通道) and shutoff channel (关断通道) of a discharge transistor (泄放晶体管) are separated. In this case, when impact occurs, the turn-on time of the discharge transistor mainly depends on the equivalent RC delay of the shutoff channel, allowing a margin for shrinking an ESD impact detection resistor and capacitor. On one hand, the shrinkage of passive resistor and capacitor can facilitate the saving of layout area, and on the other hand, the shrinkage of passive capacitor and resistor is an effective way for improving the circuit itself to prevent the false trigger during quick power-up. However, the resistor of the shutoff channel of the circuit shown in FIG. 1 is realized by a PMOS transistor of an active device, and in the integrated circuit technology, the resistor realized by an active device is difficult to achieve large resistance value generally. In order to make the detection capacitance resistance time constant (i.e. the product of C1 capacitance value and R1 resistance value) of the circuit shown in FIG. 1 actually small, the time delay of the discharge transistor shutoff channel under ESI) impact requires to be large enough, such that the passive capacitors C2 and C3 are correspondingly large, resulting in the great increase of the layout area of the chip in structure shown in FIG. 1.

SUMMARY OF THE INVENTION

I. Technical Problem to be Solved

The technical problem to be solved by the present application is: to provide an ESD protection circuit. Based on a smaller detection capacitance resistance time constant, the ESD impact realizes longer turn-on time of the discharge transistor under ESD impact and ensures the protection circuit, in a smaller layout area, has very strong discharging capability of electrostatic charge, little power leakage during power-up, and relatively strong false-trigger immunity capability for quick power-up.

II. Technical Solutions

In order to solve the above problem, the present invention provides a false-trigger free power-rail ESD clamp protection circuit, the circuit comprising an ESD impact detection component, a discharge transistor, a discharge transistor turn-on channel, and a discharge transistor shutoff channel.

The ESD impact detection component comprises NMOS transistors Mcn1 and Mcn2, a capacitor C1 and a resistor R1; the discharge transistor is NMOS transistor Mbig; the discharge transistor turn-on channel comprises PMOS transistors Mp2-1, Mp2-2 and Mp3 and an NMOS transistor Mn2; and the discharge transistor shutoff channel comprises PMOS transistors Mp4, Mp5 and Mp6, NMOS transistors Man1, Man2, Mbn1, Mbn2, Mn3, Mn4-1 and Mn4-2, and capacitors C2 and C3.

Preferably, in the ESD impact detection component, a gate of the NMOS transistor Mcn1 is connected with a lower electrode plate of the capacitor C1, an upper electrode plate of the capacitor C1 is connected with a power supply VDD of the false-trigger free power-rail ESD clamp protection circuit, a source of the NMOS transistor Mcn1 is connected with A end of the resistor R1, B end of the resistor R1 is grounded, a drain of the NMOS transistor Mcn1 is connected with the lower electrode plate of the capacitor C1, a gate of the NMOS transistor Mcn2 is connected with the lower electrode plate of the capacitor C1, a source of the NMOS transistor Mcn2 is connected with the A end of the resistor R1, and a drain of the NMOS transistor Mcn2 is connected with the power supply VDD of the false-trigger free power-rail ESD clamp protection circuit;

a source of the NMOS transistor Mbig is grounded, and a drain of the NMOS transistor Mbig is connected with the power supply VDD of the false-trigger free power-rail ESD clamp protection circuit;

in the discharge transistor turn-on channel, a gate of the PMOS transistor Mp2-1 is connected with the A end of the resistor R1, a source of the PMOS transistor Mp2-1 is connected with a gate of the PMOS transistor Mp2-2, a source of the PMOS transistor Mp2-2 is connected with the power supply VDD of the false-trigger free power-rail ESD clamp protection circuit, a drain of the PMOS transistor Mp2-2 is connected with the source of the PMOS transistor Mp2-1, a drain of the PMOS transistor Mp2-1 is connected with a gate of the PMOS transistor Mp3, a source of the PMOS transistor Mp3 is connected with the power supply VDD of the false-trigger free power-rail ESD clamp protection circuit, a drain of the PMOS transistor Mp3 is connected with a gate of the discharge transistor Mbig, a gate of the NMOS transistor Mn2 is connected with the A end of the resistor R1, a source of the NMOS transistor Mn2 is grounded, and a drain of the NMOS transistor Mn2 is connected with the gate of the PMOS transistor Mp3;

in the discharge transistor shutoff channel, a gate of the PMOS transistor Mp4 is connected with a drain of the PMOS transistor Mp5, a gate of the PMOS transistor Mp5 is connected with the A end of the resistor R1, a source of the PMOS transistor Mp5 is connected with the power supply VDD of the false-trigger free power-rail ESD clamp protection circuit, a source of the PMOS transistor Mp4 is connected with the power supply VDD of the false-trigger free power-rail ESD clamp protection circuit, a drain of the PMOS transistor Mp4 is connected with a gate of the PMOS transistor Mp6, a source of the PMOS transistor Mp6 is connected with the power supply VDD of the false-trigger free power-rail ESD clamp protection circuit, a drain of the PMOS transistor Mp6 is connected with a gate of the NMOS transistor Mn3, a source of the NMOS transistor Mn3 is grounded, a drain of the NMOS transistor Mn3 is connected with a gate of the discharge transistor Mbig, a gate of the NMOS transistor Man1 is connected with a lower electrode plate of the capacitor C2, an upper electrode plate of the capacitor C2 is connected with a drain of the PMOS transistor Mp5, a source of the NMOS transistor Man1 is grounded, a drain of the NMOS transistor Man1 is connected with the lower electrode plate of the capacitor C2, a gate of the NMOS transistor Man2 is connected with the lower electrode plate of the capacitor C2, a source of the NMOS transistor Man2 is grounded, a drain of the NMOS transistor Man2 is connected with an upper electrode plate of the capacitor C2, a gate of the NMOS transistor Mbn1 is connected with a lower electrode plate of the capacitor C3, an upper electrode plate of the capacitor C3 is connected with a drain of the PMOS transistor MP6, a source of the NMOS transistor Mbn1 is grounded, a drain of the NMOS transistor Mbn1 is connected with the lower electrode plate of the capacitor C3, a gate of the NMOS transistor Mbn2 is connected with the lower electrode plate of the capacitor C3, a source of the NMOS transistor Mbn2 is grounded, a drain of the NMOS transistor Mbn2 is connected with an upper electrode plate of the capacitor C3, a gate of the NMOS transistor Mn4-1 is connected with the upper electrode plate of the capacitor C2, a source of the NMOS transistor Mn4-1 is connected with a gate of the NMOS transistor Mn4-2, a source of the NMOS transistor Mn4-2 is grounded, a drain of the NMOS transistor Mn4-2 is connected with a source of the NMOS transistor Mn4-1, and a drain of the NMOS transistor Mn4-1 is connected with the gate of the PMOS transistor Mp6.

Preferably, the ESD impact detection component is used for identifying whether the impact applied between a power supply wire and a ground wire is an ESD impact. If it is ESD impact, a corresponding signal is sent to turns on the discharge transistor, and if it is normally powered-up, the discharge transistor is shut off; the discharge transistor is used for providing a low-resistance discharge channel for electrostatic charge brought about by the impact when ESD impact occurs; the discharge transistor turn-on channel is used for turning on the discharge transistor according to an identification signal provided by the ESD impact detection component when the ESD impact occurs; the discharge transistor shutoff channel is used for providing sufficient time delay for the shutoff state of the discharge transistor after the discharge transistor turn-on channel turns on the discharge transistor, thus ensuring that the discharge transistor is shut off after the electrostatic charge is completely discharged.

III. Beneficial Effects

The present invention uses current mirror structure for a passive capacitor in a circuit, changes the structures of standard inverters of an turn-on channel and a shutoff channel, and adopts CR+current mirror structure as an ESD impact detection component instead of RC+inverter structure, all of which will improve the turn-on time of a discharge transistor under ESD impact at different extent. The current mirror is used for the passive capacitor so as to greatly reduce the layout area of whole protection circuit, meanwhile, after the detection capacitance resistance time constant become smaller, the false-trigger immunity capability of the protection circuit for quick power-up is enhanced, and the power leakage is very small when the protection circuit of the present invention is normally powered up.

BRIEF DESCRIPTION OF THE DRAWINGS

In order to more clearly describe embodiments of the present invention or the technical solutions in the prior art, brief description of the drawings required to be used in the description of embodiment or the prior art are given below. Obviously, the figures described below is some embodiments of the present invention, and a person skilled in the art also can obtain the other figures according to these figures without creative effort.

DETAILED DESCRIPTION OF THE PREFERRED EMBODIMENTS

In order to enable the purposes, technical solutions and advantages of embodiment of the present invention more clearly, the technical solutions of embodiment of the present invention are clearly described below by combining figures in Examples of the present invention. Obviously, the described embodiments are some but not all examples of the present invention. Based on the embodiments in the present invention, all other embodiments obtained by a person skilled in the art without creative effort belongs to the protection scope of the present invention.

The specific embodiments of the present invention are further described in detail below by combining the figures and the embodiments. The following embodiments are used for describing the present invention, but not limiting the scope of the present invention.

The detailed description of the present invention by combining the Figures and the Examples is given below.

Figure 2:
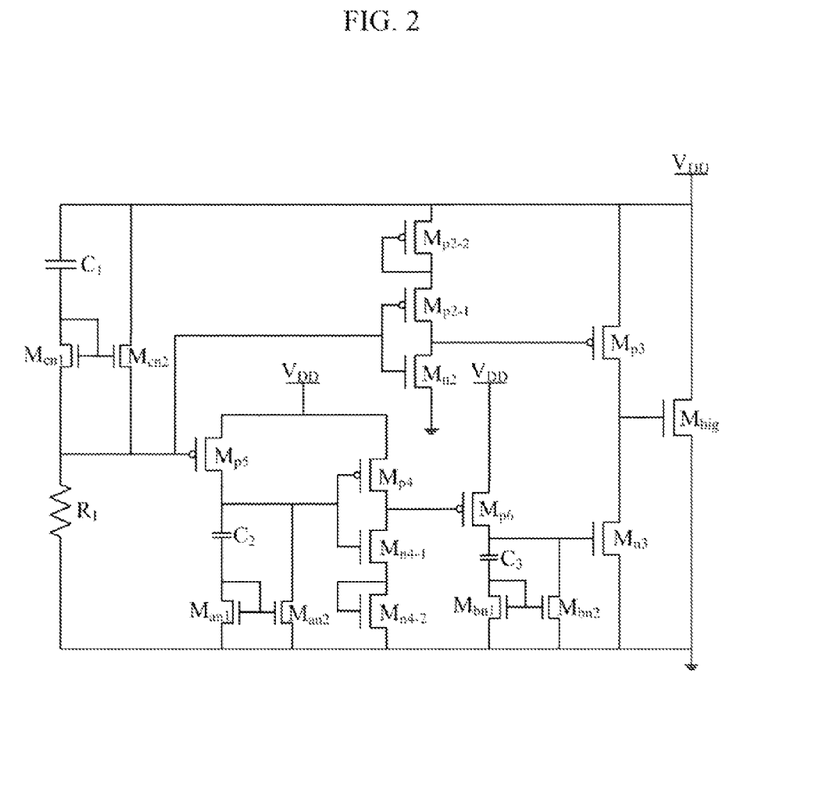
FIG. 2 is a structural schematic diagram of the false-trigger free power-rail ESD clamp protection circuit of an embodiment of the present invention.

FIG. 2 is a structural schematic diagram of the false-trigger free power-rail ESD clamp protection circuit of one embodiment of the present invention, the circuit comprising an ESD impact detection component, a discharge transistor, a discharge transistor turn-on channel, and a discharge transistor shutoff channel.

The ESD impact detection component is used for identifying whether the impact applied between a power supply wire and a ground wire is an ESD impact. If it is ESD impact, a corresponding signal is sent to turn on the discharge transistor, and if it is normally powered-up, the discharge transistor is shut off; the discharge transistor is used for providing a low-resistance discharge channel for electrostatic charge brought about by the impact when ESD impact occurs; the discharge transistor turn-on channel is used for turning on the discharge transistor according to an identification signal provided by the ESD impact detection component when the ESD impact occurs; the discharge transistor shutoff channel is used for providing sufficient time delay for the turn-on state of the discharge transistor after the discharge transistor turn-on channel turns on the discharge transistor, thus ensuring that the discharge transistor is shutoff after the electrostatic charge is completely discharged.

Wherein, in the ESD impact detection component, a gate of the NMOS transistor Mcn1 is connected with a lower electrode plate of the capacitor C1, an upper electrode plate of the capacitor C1 is connected with a power supply VDD of the false-trigger free power-rail ESD clamp protection circuit, a source of the NMOS transistor Mcn1 is connected with A end of the resistor R1, B end of the resistor R1 is grounded, a drain of the NMOS transistor Mcn1 is connected with the lower electrode plate of the capacitor C1, a gate of the NMOS transistor Mcn2 is connected with the lower electrode plate of the capacitor C1, a source of the NMOS transistor Mcn2 is connected with the A end of the resistor R1, and a drain of the NMOS transistor Mcn2 is connected with the power supply VDD of the false-trigger free power-rail ESD clamp protection circuit;

a source of the NMOS transistor Mbig is grounded, and a drain of the NMOS transistor Mbig is connected with the power supply VDD of the false-trigger free power-rail ESD clamp protection circuit;

in the discharge transistor turn-on channel, a gate of the PMOS transistor Mp2-1 is connected with the A end of the resistor R1, a source of the PMOS transistor Mp2-1 is connected with a gate of the PMOS transistor Mp2-2, a source of the PMOS transistor Mp2-2 is connected with the power supply VDD of the false-trigger free power-rail ESD clamp protection circuit, a drain of the PMOS transistor Mp2-2 is connected with the source of the PMOS transistor Mp2-1, a drain of the PMOS transistor Mp2-1 is connected with a gate of the PMOS transistor Mp3, a source of the PMOS transistor Mp3 is connected with the power supply VDD of the false-trigger free power-rail ESD clamp protection circuit, a drain of the PMOS transistor Mp3 is connected with a gate of the discharge transistor Mbig, a gate of the NMOS transistor Mn2 is connected with the A end of the resistor R1, a source of the NMOS transistor Mn2 is grounded, and a drain of the NMOS transistor Mn2 is connected with the gate of the PMOS transistor Mp3;

in the discharge transistor shutoff channel, a gate of the PMOS transistor Mp4 is connected with a drain of the PMOS transistor Mp5, a gate of the PMOS transistor Mp5 is connected with the A end of the resistor R1, a source of the PMOS transistor Mp5 is connected with the power supply VDD of the false-trigger free power-rail ESD clamp protection circuit, a source of the PMOS transistor Mp4 is connected with the power supply VDD of the false-trigger free power-rail ESD clamp protection circuit, a drain of the PMOS transistor Mp4 is connected with a gate of the PMOS transistor Mp6, a source of the PMOS transistor Mp6 is connected with the power supply VDD of the false-trigger free power-rail ESD clamp protection circuit, a drain of the PMOS transistor Mp6 is connected with a gate of the NMOS transistor Mn3, a source of the NMOS transistor Mn3 is grounded, a drain of the NMOS transistor Mn3 is connected with a gate of the discharge transistor Mbig, a gate of the NMOS transistor Man1 is connected with a lower electrode plate of the capacitor C2, an upper electrode plate of the capacitor C2 is connected with a drain of the PMOS transistor Mp5, a source of the NMOS transistor Man1 is grounded, a drain of the NMOS transistor Man1 is connected with the lower electrode plate of the capacitor C2, a gate of the NMOS transistor Man2 is connected with the lower electrode plate of the capacitor C2, a source of the NMOS transistor Man2 is grounded, a drain of the NMOS transistor Man2 is connected with an upper electrode plate of the capacitor C2, a gate of the NMOS transistor Mbn1 is connected with a lower electrode plate of the capacitor C3, an upper electrode plate of the capacitor C3 is connected with a drain of the PMOS transistor MP6, a source of the NMOS transistor Mbn1 is grounded, a drain of the NMOS transistor Mbn1 is connected with the lower electrode plate of the capacitor C3, a gate of the NMOS transistor Mbn2 is connected with the lower electrode plate of the capacitor C3, a source of the NMOS transistor Mbn2 is grounded, a drain of the NMOS transistor Mbn2 is connected with an upper electrode plate of the capacitor C3, a gate of the NMOS transistor Mn4-1 is connected with the upper electrode plate of the capacitor C2, a source of the NMOS transistor Mn4-1 is connected with a gate of the NMOS transistor Mn4-2, a source of the NMOS transistor Mn4-2 is grounded, a drain of the NMOS transistor Mn4-2 is connected with a source of the NMOS transistor Mn4-1, and a drain of the NMOS transistor Mn4-1 is connected with the gate of the PMOS transistor Mp6.

Figure 3:
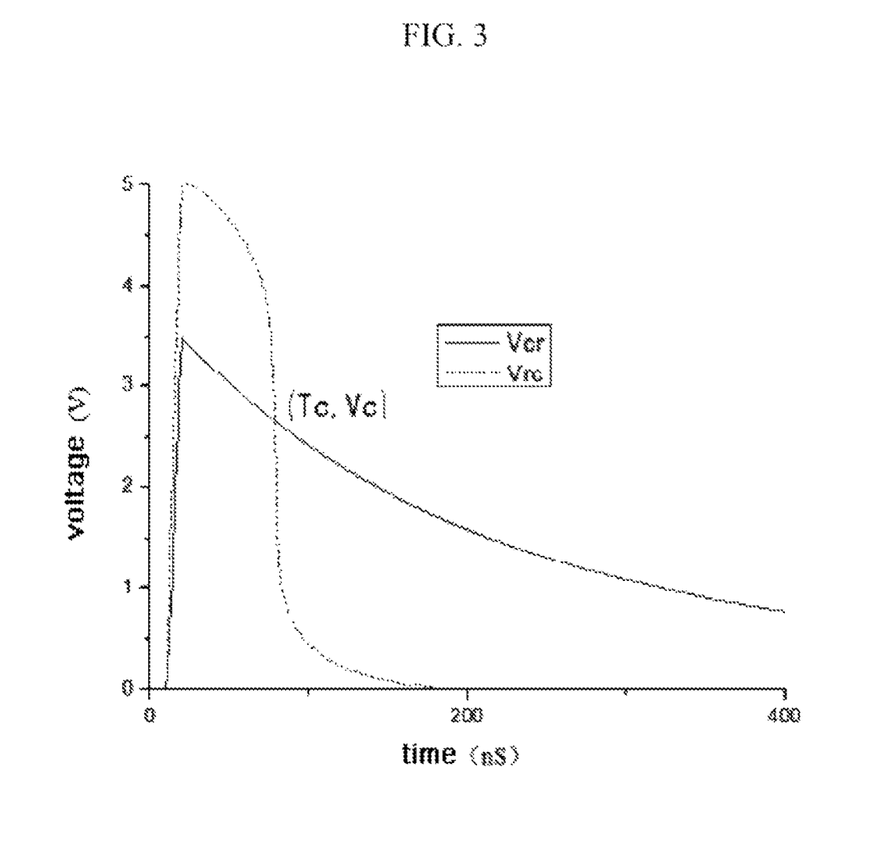
FIG. 3 is a schematic diagram of changes of output voltages of CR+current mirror structure and RC+inverter structure along with time under the same ESD impact.

The false-trigger free power-rail ESD clamp protection circuit proposed in the above embodiments of the present invention firstly adopts CR+current mirror structure (i.e. C1, R1 and Mcn1, Mcn2 structures shown in FIG. 2) as an ESD impact detection component instead of RC+inverter structure in the prior art (i.e. C1, R1 and Mp1, Mn1 structures shown in FIG. 1). As shown in FIG. 3, Vcr represents the output of the CR+current mirror structure under ESD impact, and Vrc represents the output of the RC+inverter structure under the same ESD impact. It can be seen that: after the output voltages of both of them achieve maximum values, the dropping rate of the output voltage of the CR+current mirror structure is obviously slower than that of the RC+inverter structure. Meanwhile, the maximum value of the output voltage of the CR+current mirror structure is not as larger as that of the RC+inverter structure. The intersection coordinate of two waveforms in FIG. 3 is defined as (Tc, Vc), and the turn-on critical voltage of the discharge transistor shutoff channel is defined as Voff. So only when Voff<Vc, the use of CR+current mirror structure instead of RC+inverter structure can enhance electrostatic charge discharge capability of the discharge transistor under ESD impact.

In order to realize the condition of Voff<Vc, the false-trigger free power-rail ESI) clamp protection circuit of the present invention also adopts current mirror structure for passive capacitors C2 and C3 of the discharge transistor shutoff channel. By using the current mirror, the equivalent RC delay of the discharge transistor shutoff channel is increased, such that the output of the ESD impact detection component requires a smaller voltage value to turns on the discharge transistor shutoff channel, so as to ensure that the condition of Voff<Vc is realized. Meanwhile, the increase itself of the equivalent RC delay of the discharge transistor shutoff channel is beneficial to the improvement of the discharge transistor discharge capability when ESD impact occurs.

The use of the three current mirror structures each has the effect of improving the discharge transistor Mbig discharge capability when the impact occurs. Among the effects thereof also exists mutually-enhancing relationship, so the combination of them can obtain higher level of electrostatic charge discharge capability of the discharge transistor. Meanwhile, the use of discharge transistor shutoff channel mitigates the problem that the equivalent resistance value of the active PMOS transistor is very small, so as to control the whole layout area of the protection circuit in a reasonable range. Using a current mirror for the capacitor C1 of the ESD detection component can make the size of C1 itself be $1/10$ of C2 and C3, and does not approximately change the value of the equivalent capacitor of the ESD impact detection component itself. The shrinkage of C1 by 10 times greatly contributes to the saving of the layout area. The fact that the discharge transistor discharge capability is enhanced when impact occurs gives larger design margin for C1 and R1, that is to say, smaller C1 and R1 can be used as ESD impact detection component, which facilitates the improvement of false-trigger-proof capability of the protection circuit itself, and at the same time, the circuit structure of the present invention also ensures that the turn-on time of the discharge transistor is not affected when ESD impact occurs. Compared to a standard inverter structure, the inverter in the discharge transistor turn-on channel additionally has a PMOS transistor Mp2-2 in diode connection form, and the Mp2-2 is used for reducing the logical threshold voltage Vit of the inverter of this level. The reduction of Vit results in that when ESD impact occurs, the output of the inverter of this level drops earlier, so as to ensure that the discharge transistor is rapidly turned on, and simultaneously that after ESD impact occurs, along with the dropping of the output voltage of the ESD impact detection component, the output of the inverter of this level increases later to delay the shutoff time of the discharge transistor turn-on channel, so as to make the discharge transistor turn on for a longer time.

Compared to a standard inverter structure, the inverter in the discharge transistor shutoff channel additionally has an NMOS transistor Mn4-2 in diode connection form, and the Mn4-2 is used for increasing the logical threshold voltage Vit of the inverter of this level. After ESD impact occurs, along with the dropping of the output voltage of the ESD impact detection component, the PMOS transistor Mp5 is stepwise turned on and charges the capacitor C2. When the voltage of the C2 upper electrode plate increases to a certain degree, the output voltage of the inverter of C2 subsequent level will drop from a high value to a lower value, and the increase of Vit makes the above process of dropping from a high value to a low value delay in time, so as to prolong the turn-on time of the discharge transistor under ESD impact.

Figure 4:
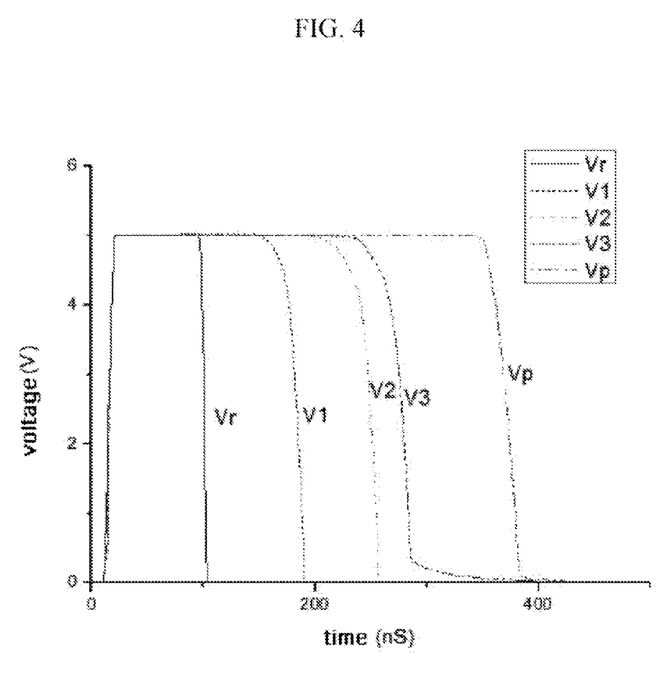
FIG. 4 is an effect exhibition of prolonging turn-on time of the discharge transistor brought about by each improved step under the same ESD impact.

FIG. 4 shows the effect of each improved step of the present invention in prolonging turn-on time of the discharge transistor under the same ESD impact. Vr represents the change situation of the gate voltage of the discharge transistor of the circuit shown in FIG. 1 along with time under ESD impact; V1 represents the change situation of the gate voltage of the discharge transistor along with time after using current mirrors for the capacitors C2 and C3 of the discharge transistor shutoff channel based on the structure shown in FIG. 1; V2 represents the change situation of the gate voltage of the discharge transistor along with time after using CR+current mirror structure instead of RC+inverter structure as ESD impact detection component based on V1; V3 represents the change situation of the gate voltage of the discharge transistor along with time after changing the structure of the inverter of the discharge transistor turn-on channel based on V2; and Vp represents the change situation of the gate voltage of the discharge transistor of the false-trigger free power-rail ESD clamp protection circuit of the present invention along with time. The effect of prolonging the turn-on time of the discharge transistor under ESD impact brought about by the improvement of each step can be seen from FIG. 4, and the turn-on time of the discharge transistor of the circuit structure of the present invention under ESD impact is almost 4 times of that of the structure shown in FIG. 1.

Figure 5:
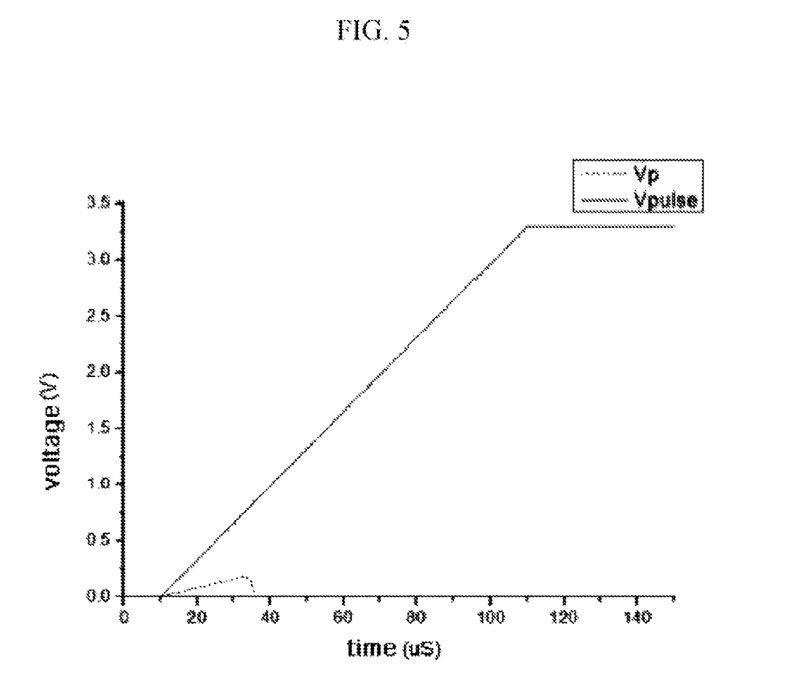
FIG. 5 is a schematic diagram of changes of power-up voltage and the gate voltage of the discharge transistor in the circuit structure of the present invention along with time under normal power-up condition.

In FIG. 5, Vpulse represents normal power-up voltage, and Vp represents the change situation of the gate voltage of the discharge transistor along with time when the circuit structure of the present invention is normally powered up. It can be seen that the power leakage of the false-trigger free power-rail ESD clamp protection circuit of the present invention is very small during normal power-up.

The key improvement of the above embodiments of the present invention is as follows: equivalently amplifying a passive device through an active device, regulating the structure of a standard inverter structure according to the function of the standard inverter in the circuit and changing the relative positions of a capacitor and a resistance in the ESD impact detection component, all of which can improve the charge discharge capability of the discharge transistor under ESD impact, so as to make the turn-on time of the discharge transistor out of control of the detection capacitance resistance time constant (i.e. the product of C1 capacitance value and R1 resistance value). The detection capacitance resistance time constant can be diminished so as to improve the false-trigger immunity capability of the circuit caused by quick power-up. The above three aspects of improvement has mutually-enhancing effect on the prolonging effect of the discharge transistor turn-on time under ESD impact, and the current mirror is used for greatly reducing the layout area of the protection circuit. Meanwhile, experiments show that the protection circuit of the present invention does not obviously deteriorate the power leakage of the discharge transistor during normal power-up.

In conclusion, by the improvement of the circuit structure, the circuit structure of the present invention greatly increases the turn-on time of the discharge transistor under ESD impact, so as to diminish the detection capacitance resistance time constant and thus reduce the probability of false-trigger occurrence of the protection circuit during quick power-up. Meanwhile, the shrinkage of passive capacitor greatly saves the layout area, and the power leakage of the whole circuit structure is very small when a chip is normally powered up.

The above embodiments are only used for describing the present invention, not limiting the present invention. The person skilled in the related art also can make various changes and modifications without departing from the spirit and the scope of the present invention. Therefore, all equivalent technical solutions also belong to the scope of the present invention. The protection scope of the present invention should be defined by claims.

What is claimed is:

1. A false-trigger free power-rail ESD clamp protection circuit, wherein the circuit comprises an ESD impact detection component, a discharge transistor, a discharge transistor turn-on channel, and a discharge transistor shutoff channel; the ESD impact detection component comprises NMOS transistors (Mcn1) and (Mcn2), a capacitor (C1) and a resistor (R1); the discharge transistor is a NMOS transistor (Mbig); the discharge transistor turn-on channel comprises PMOS transistors (Mp2-1), (Mp2-2) and (Mp3) and an NMOS transistor (Mn2); and the discharge transistor shutoff channel comprises PMOS transistors (Mp4), (Mp5) and (Mp6), NMOS transistors (Man1), (Man2), (Mbn1), (Mbn2), (Mn3), (Mn4-1) and (Mn4-2), and capacitors (C2) and (C3).

2. The false-trigger free power-rail ESD clamp protection circuit according to claim 1, wherein in the ESD impact detection component, a gate of the NMOS transistor (Mcn1) is connected with a lower electrode plate of the capacitor (C1), an upper electrode plate of the capacitor (C1) is connected with a power supply (VDD) of the false-trigger free power-rail ESD clamp protection circuit, a source of the NMOS transistor (Mcn1) is connected with end (A) of the resistor (R1), end (B) of the resistor (R1) is grounded, a drain of the NMOS transistor (Mcn1) is connected with the lower electrode plate of the capacitor (C1), a gate of the NMOS transistor (Mcn2) is connected with the lower electrode plate of the capacitor (C1), a source of the NMOS transistor (Mcn2) is connected with end (A) of the resistor (R1), and a drain of the NMOS transistor (Mcn2) is connected with the power supply VDD of the false-trigger free power-rail ESD clamp protection circuit;

a source of the NMOS transistor (Mbig) is grounded, and a drain of the NMOS transistor (Mbig) is connected with the power supply (VDD) of the false-trigger free power-rail ESD clamp protection circuit;

in the discharge transistor turn-on channel, a gate of the PMOS transistor (Mp2-1) is connected with end (A) of the resistor (R1), a source of the PMOS transistor (Mp2-1) is connected with a gate of the PMOS transistor (Mp2-2), a source of the PMOS transistor (Mp2-2) is connected with the power supply (VDD) of the false-trigger free power-rail ESD clamp protection circuit, a drain of the PMOS transistor (Mp2-2) is connected with the source of the PMOS transistor (Mp2-1), a drain of the PMOS transistor (Mp2-1) is connected with a gate of the PMOS transistor (Mp3), a source of the PMOS transistor (Mp3) is connected with the power supply (VDD) of the false-trigger free power-rail ESD clamp protection circuit, a drain of the PMOS transistor (Mp3) is connected with a gate of the discharge transistor (Mbig), a gate of the NMOS transistor (Mn2) is connected with end (A) of the resistor (R1), a source of the NMOS transistor (Mn2) is grounded, and a drain of the NMOS transistor (Mn2) is connected with the gate of the PMOS transistor (Mp3);

in the discharge transistor shutoff channel, a gate of the PMOS transistor (Mp4) is connected with a drain of the PMOS transistor (Mp5), a gate of the PMOS transistor (Mp5) is connected with end (A) of the resistor (R1), a source of the PMOS transistor (Mp5) is connected with the power supply (VDD) of the false-trigger free power-rail ESD clamp protection circuit, a source of the PMOS transistor (Mp4) is connected with the power supply (VDD) of the false-trigger free power-rail ESD clamp protection circuit, a drain of the PMOS transistor (Mp4) is connected with a gate of the PMOS transistor (Mp6), a source of the PMOS transistor (Mp6) is connected with the power supply (VDD) of the false-trigger free power-rail ESD clamp protection circuit, a drain of the PMOS transistor (Mp6) is connected with a gate of the NMOS transistor (Mn3), a source of the NMOS transistor (Mn3) is grounded, a drain of the NMOS transistor (Mn3) is connected with a gate of the discharge transistor (Mbig), a gate of the NMOS transistor (Man1) is connected with a lower electrode plate of the capacitor (C2), an upper electrode plate of the capacitor (C2) is connected with a drain of the PMOS transistor (Mp5), a source of the NMOS transistor (Man1) is grounded, a drain of the NMOS transistor (Man1) is connected with the lower electrode plate of the capacitor (C2), a gate of the NMOS transistor (Man2) is connected with the lower electrode plate of the capacitor (C2), a source of the NMOS transistor (Man2) is grounded, a drain of the NMOS transistor (Man2) is connected with the upper electrode plate of the capacitor (C2), a gate of the NMOS transistor (Mbn1) is connected with the lower electrode plate of the capacitor (C3) an upper electrode plate of the capacitor (C3) is connected with a drain of the PMOS transistor (MP6), a source of the NMOS transistor (Mbn1) is grounded, a drain of the NMOS transistor (Mbn1) is connected with the lower electrode plate of the capacitor (C3) a gate of the NMOS transistor (Mbn2) is connected with the lower electrode plate of the capacitor (C3), a source of the NMOS transistor (Mbn2) is grounded, a drain of the NMOS transistor (Mbn2) is connected with the upper electrode plate of the capacitor (C3) a gate of the NMOS transistor (Mn4-1) is connected with the upper electrode plate of the capacitor (C2), a source of the NMOS transistor (Mn4-1) is connected with a gate of the NMOS transistor (Mn4-2), a source of the NMOS transistor (Mn4-2) is grounded, a drain of the NMOS transistor (Mn4-2) is connected with a source of the NMOS transistor (Mn4-1), and a drain of the NMOS transistor (Mn4-1) is connected with the gate of the PMOS transistor (Mp6).

3. The false-trigger free power-rail ESD clamp protection circuit according to claim 1, wherein the ESD impact detection component identifies whether an impact applied between a power supply wire and a ground wire is an ESD impact; when the impact is the ESD impact, a corresponding signal is sent to turn on the discharge transistor, and when the circuit is normally powered up, the discharge transistor is shut off; the discharge transistor provides a low-resistance discharge channel for electrostatic charge brought about when the ESD impact occurs; the discharge transistor turn-on channel turns on the discharge transistor according to an identification signal provided by the ESD impact detection component when the ESD impact occurs; the discharge transistor shutoff channel provides sufficient time delay for the turn-on state of the discharge transistor after the discharge transistor turn-on channel turns on the discharge transistor, thus ensuring that the discharge transistor is shut off after the electrostatic charge is completely discharged.

4. The false-trigger free power-rail ESD clamp protection circuit according to claim 2, wherein the ESD impact detection component identifies whether an impact applied between a power supply wire and a ground wire is an ESD impact; when the impact is the ESD impact, a corresponding signal is sent to turn on the discharge transistor, and when the circuit is normally powered up, the discharge transistor is shut off; the discharge transistor provides a low-resistance discharge channel for electrostatic charge brought about by the impact when ESD impact occurs; the discharge transistor turn-on channel turns on the discharge transistor according to an identification signal provided by the ESD impact detection component when the ESD impact occurs; the discharge transistor shutoff channel provides sufficient time delay for the turn-on state of the discharge transistor after the discharge transistor turn-on channel turns on the discharge transistor, thus ensuring that the discharge transistor is shut off after the electrostatic charge is completely discharged.

5. A false-trigger free power-rail ESD clamp protection circuit, wherein the circuit comprises:
   an ESD impact detection component which generates an impact identification signal when an ESD impact occurs, and includes a first capacitor, a first resistor and at least two first transistors disposed in a first current mirror structure;
   a discharge transistor;
   a discharge transistor turn-on channel which turns on the discharge transistor when the impact identification signal is received from the ESD impact detection component;
   and a discharge transistor shutoff channel that provides a time delay for a shutoff state of the discharge transistor after the discharge transistor turn-on channel turns on the discharge transistor.

6. The false-trigger free power-rail ESD clamp protection circuit of claim 5, wherein the at least two first transistors are NMOS transistors.

7. The false-trigger free power-rail ESD clamp protection circuit of claim 6, wherein the discharge transistor is a NMOS transistor.

8. The false-trigger free power-rail ESD clamp protection circuit of claim 7, wherein the discharge transistor has a turn-on time which is out of a control of a detection capacitance resistance time constant.

9. The false-trigger free power-rail ESD clamp protection circuit of claim 8, wherein the detection capacitance resistance time constant is a product of a capacitance value of the first capacitor and a resistance value of the first resistor.

10. The false-trigger free power-rail ESD clamp protection circuit of claim 5, wherein the time delay is sufficient enough to ensure that the discharge transistor is shut off after an electrostatic charge is completely discharged.

11. The false-trigger free power-rail ESD clamp protection circuit of claim 5,
   wherein the discharge transistor turn-on channel comprises at least 3 PMOS transistors and an NMOS transistor,
   wherein the discharge transistor shutoff channel comprises at least two passive capacitors, at least 3 PMOS transistors, at least two second NMOS transistors disposed in a second current mirror structure, at least two third NMOS transistors disposed in a third current mirror structure, and
   wherein the second and third current mirror structures increase a time delay of the discharge transistor shutoff channel such that an output of the ESD impact detection component requires a smaller voltage value to turn on the discharge transistor shutoff channel.

* * * * *

UNITED STATES PATENT AND TRADEMARK OFFICE
CERTIFICATE OF CORRECTION

PATENT NO. : 9,531,188 B2  
APPLICATION NO. : 14/407027  
DATED : December 27, 2016  
INVENTOR(S) : Yuan Wang et al.

Page 1 of 1

It is certified that error appears in the above-identified patent and that said Letters Patent is hereby corrected as shown below:

On the Title Page

Change the Foreign Application Number as follows:
(30)    Foreign Application Priority Data
Jan. 9, 2013 (CN) .............................. 2013 1 0007998.3

Signed and Sealed this
Twenty-eighth Day of February, 2017

Michelle K. Lee
*Director of the United States Patent and Trademark Office*